Patented June 21, 1927.

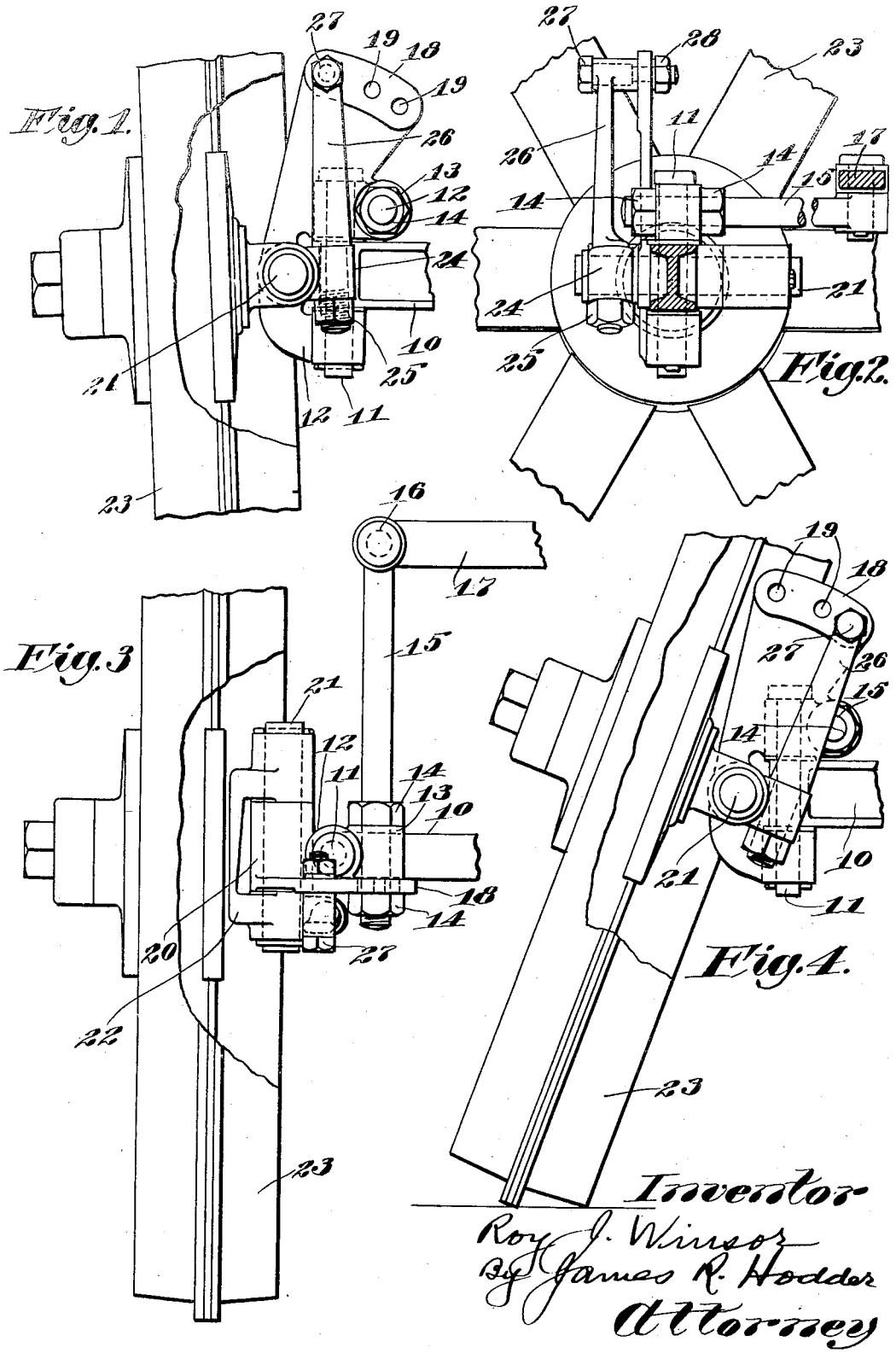

1,633,151

UNITED STATES PATENT OFFICE.

ROY J. WINSOR, OF BUCYRUS, OHIO.

LEANING WHEEL.

Application filed January 2, 1926. Serial No. 78,805.

My present invention relates to leaning wheels, and more particularly to an improved mounting therefor.

In connection with vehicles, or with machinery, mounted on wheels where it is necessary to work on a side hill or in a ditch, various attempts have been made to provide a leaning wheel structure to compensate for the difference in height of one side of the vehicle from the other or to provide a means for easily steering the vehicle while maintaining the same in position on a side hill or in the ditch. Heretofore all leaning wheel devices such, for example, as are used on road equipment, are used, so far as I am aware, with a stationary axle, and necessarily, where the wheels are leaned on the front axle, the whole axle is turned to get steerage for the machine. Where such leaning wheel devices have been used on the rear axle, such axle is stationary with regard to the remaining portions of the machine. On all such prior devices, and particularly where such devices are used in ditch work, there is a tendency for the hub of the wheel to strike the banks of the ditch with the result that it is extremely difficult to steer the machine and the draft of the machine comes really on the hub of the wheel instead of on the bottom of the wheel as it should.

In my present invention I have obviated the objection to prior structures and have devised a leaning wheel structure wherein the leaning wheel device is used in conjunction with a steering spindle such as is ordinarily employed in automotive work. So far as I am aware, this construction has never been utilized. By placing the leaning wheel on a device associated with the steering spindle, the operator is allowed a free and easy operation of the steering wheel at all times and the draft is thrown to the bottom of the wheel or at the bottom of the ditch and, therefore, free and easy steering is provided.

In carrying out my invention, I substitute a member for the usual steering spindle and provide means thereon for attaching it to the steering mechanism of the machine. On this attachment I mount the usual steering spindle, but mount the same to rotate about a horizontal axis instead of a substantially vertical axis as heretofore has been necessary. Further, I provide means for adjusting the position of the steering spindle carrying the wheel with respect to the attachment. This construction allows the operator to set the wheel straight up or at any angle he chooses, and in no way does it interfere with the operation of the axle of the machine as originally designed.

The object of my invention, therefore, is an improved leaning wheel device for use in automotive vehicles.

In the accompanying drawings illustrating the preferred embodiment of my invention, Fig. 1 is a rear elevation of my improved device attached to the axle of a motor vehicle;

Fig. 2 is a side elevation of Fig. 1;

Fig. 3 is a plan view of Fig. 1, and

Fig. 4 is a front elevation similar to Fig. 1, but showing the wheel in a different position relative to its mounting.

Referring to the drawings, 10 designates the front axle of a motor vehicle, and pivotally mounted on the vertical axle 11 located at the end of the front axle 10 is a member 12. This member 12 may be a forging or casting, as desired. Secured to a projecting portion 13 of said member 12 by nuts 14 is one end of an arm 15 and pivotally attached to the outer free end of such arm 15 by shaft 16 is one end of a reach rod 17, it being understood, of course, that this reach rod is also connected to a similar rod 15 at the other end of the axle. Formed integral with the member 12 and extending upwardly therefrom is a plate-like member 18, this member being provided, as clearly shown in Figs. 1 and 4, with a plurality of parallelly arranged perforations 19 for a purpose to be hereinafter described.

Formed integral with the member 12 is a bearing boss 20 drilled to receive a vertically positioned spindle 21, this spindle lying at right angles to the shaft or spindle 11 and therefore lies in a substantially horizontal plane. Rotatably mounted on the spindle 21 is the wheel spindle 22 and such spindle 22 may very well be the usual and ordinary wheel spindle supplied with the vehicle itself. Rotatably mounted on the spindle 22 is a wheel 23 which may be the usual or ordinary wheel supplied with the vehicle or, as shown in the drawings, a special form of wheel usually furnished with tractors and the like. Formed as a part of the spindle 22 is a boss 24 in which is secured, by nut 25, a vertically extending member 26 that lies substantially parallel to, but spaced apart from, the plate-like member and with its end terminating adjacent to the upper ends of such plate-like member. The upper end of the member 26 is perforated to receive a threaded bolt 27 of a diameter to easily pass through either of the perforations 19, and a nut 28 is threaded on the bolt 27 to firmly secure the members 18 and 26 in position relative to each other.

By means of the members 18, 26, and bolt 27 the member 12 and the steering knuckle 22 are rigidly secured together, and by changing the position of the members 18 and 26 relative to each other, the members 12 and 22 are maintained in position with the wheel carrying portion of the spindle 22 making any desired angle with the horizontal, as clearly shown in Fig. 4. Whether the members 18 and 26 be held in the adjusted position shown in Fig. 1 or in the adjusted position shown in Fig. 4, the steering of the vehicle is accomplished easily and in the usual way. It will be obvious, however, that, when the parts referred to are in the position shown in Fig. 4, and assuming that the wheel 23 is in engagement with the side of a ditch, then the draft will be thrown to the bottom of the wheel 23, and under no circumstances can the hub of the wheel 23 interfere with the steering as it might do were the device of the usual type. I have found that, with my present device, all objections to prior types of leaning wheels and carrying devices therefor are eliminated; that the steering of machines carrying such devices is relatively easy and compares favorably with the steering qualities of a machine travelling along a substantially horizontal roadway.

While I have necessarily shown and described my preferred embodiment somewhat in detail, it is to be understood that I may vary the size, shape, and arrangement of parts comprising my invention within wide limits without departing from the spirit of the invention.

Having thus described my invention, what I claim as new is:

1. An improved leaning wheel device, comprising an axle, a steering knuckle rotatably mounted thereon, a wheel spindle mounted on said knuckle, means for adjusting the wheel spindle relative to the steering knuckle, and means for maintaining the wheel spindle rigidly in its adjusted position.

2. An improved leaning wheel device, comprising a steering knuckle, a horizontal shaft mounted thereon, a plate formed integral with said steering knuckle and provided with a plurality of perforations lying in an arcuate path about the shaft as a center, a wheel spindle rotatably mounted on said shaft, an arm secured to said wheel spindle and lying parallel to the plate, and means carried by said arm and cooperating with the perforations for maintaining the wheel spindle in adjusted position relative to the steering knuckle.

In testimony whereof, I have signed my name to this specification.

ROY J. WINSOR.